United States Patent [19]

Ainsworth

[11] Patent Number: 4,598,339

[45] Date of Patent: Jul. 1, 1986

[54] LIGHT WAND ASSEMBLY FOR BICYCLES, MOTORBIKES, ETC.

[75] Inventor: Michael Ainsworth, Detroit, Mich.

[73] Assignees: George Ainsworth; Mina Ainsworth; Robert Ainsworth, all of Detroit, Mich. ; part interest to each

[21] Appl. No.: 708,035

[22] Filed: Mar. 4, 1985

[51] Int. Cl.$^4$ .......................... B62J 6/00; F21V 33/00
[52] U.S. Cl. ....................... 362/72; 362/184; 362/236; 340/134; 280/289 R; 116/28 R
[58] Field of Search ................... 362/72, 78, 184, 186, 362/191, 800, 431, 806, 811, 32, 217, 219, 223, 236; 340/134, 119, 84, 87; 280/289 R; 116/56, 28 R

[56] References Cited

U.S. PATENT DOCUMENTS

| | | |
|---|---|---|
| 3,862,410 | 1/1975 | Maxwell . |
| 3,890,497 | 6/1975 | Rush . |
| 4,020,335 | 4/1977 | Bisceglia ............................ 340/87 |
| 4,023,032 | 5/1977 | Taylor . |
| 4,041,452 | 8/1977 | Moya ................................ 340/134 |
| 4,099,222 | 7/1978 | Cornell .............................. 362/72 |
| 4,157,075 | 6/1979 | Kirvutza ............................ 116/56 |
| 4,274,127 | 6/1981 | Beck ................................. 362/72 |
| 4,309,741 | 1/1982 | Smith ................................ 362/72 |

FOREIGN PATENT DOCUMENTS 2843238  4/1980  Fed. Rep. of Germany ...... 362/249

*Primary Examiner*—Charles J. Myhre
*Assistant Examiner*—David A. Okonsky
*Attorney, Agent, or Firm*—Cullen, Sloman, Cantor, Grauer, Scott & Rutherford

[57] ABSTRACT

In a light wand assembly for bicycles, motorbikes, snowmobiles, wheelchairs or a person including a frame support member thereon, an electrical component case, a clamp on the case secured to the support member, an electrical power source, a socket arm upon the case, a tubular flagpole projected into the socket arm, the improvement which comprises a circuit board having a solid state printed circuit thereon positioned within the case and connected to the power source. The circuit includes a plurality of individually operable sequencer generating circuits, and an on/off sequencer selector control switch on the case for selective connection to any of the sequencer generating circuits. A transparent tubular light wand projects into the flagpole, and a series of longitudinally spaced bulbs are nested within the wand along its length. A cable is selectively connected to one of said sequencer circuits and includes a plurality of leadwires individually connected to each of the bulbs, for intermittent illumination thereof in accordance with one of the sequence generating circuits for a predetermined sequence of progressive illumination along the length of the wand.

16 Claims, 7 Drawing Figures

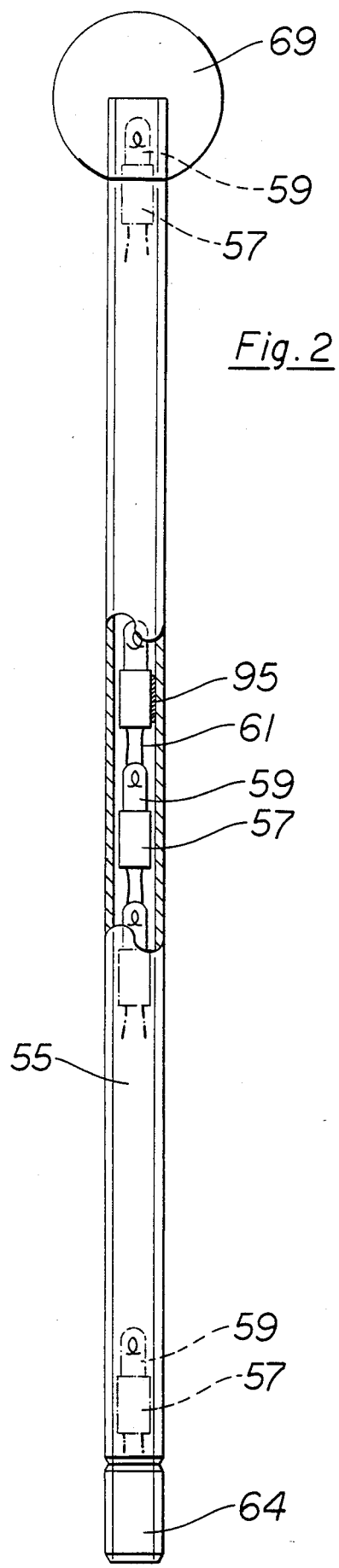
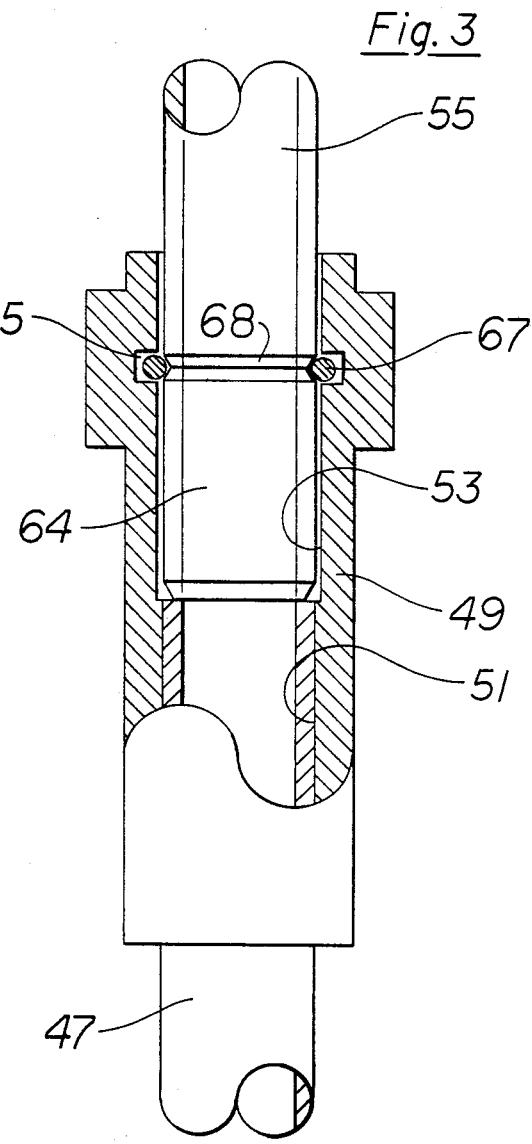

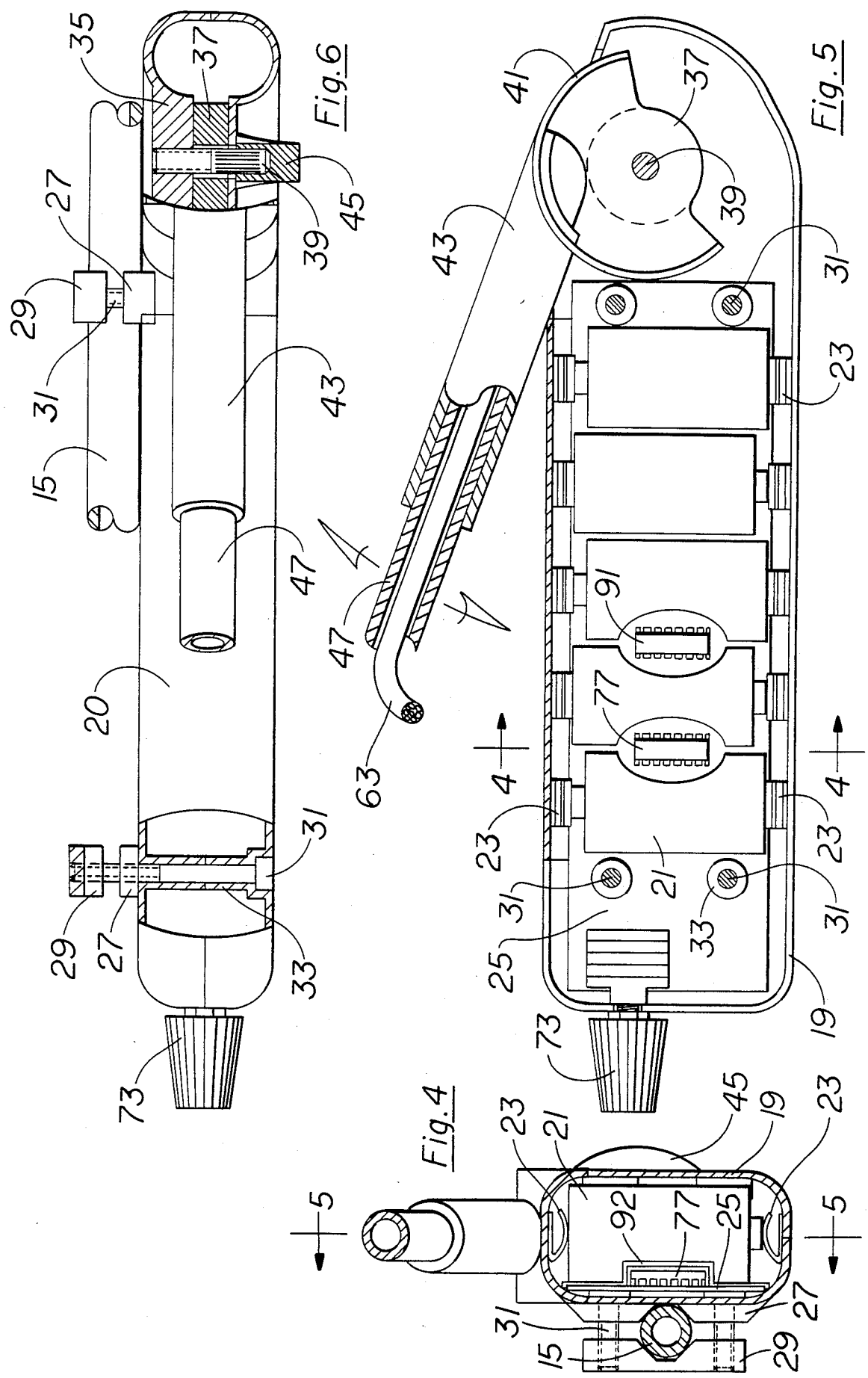

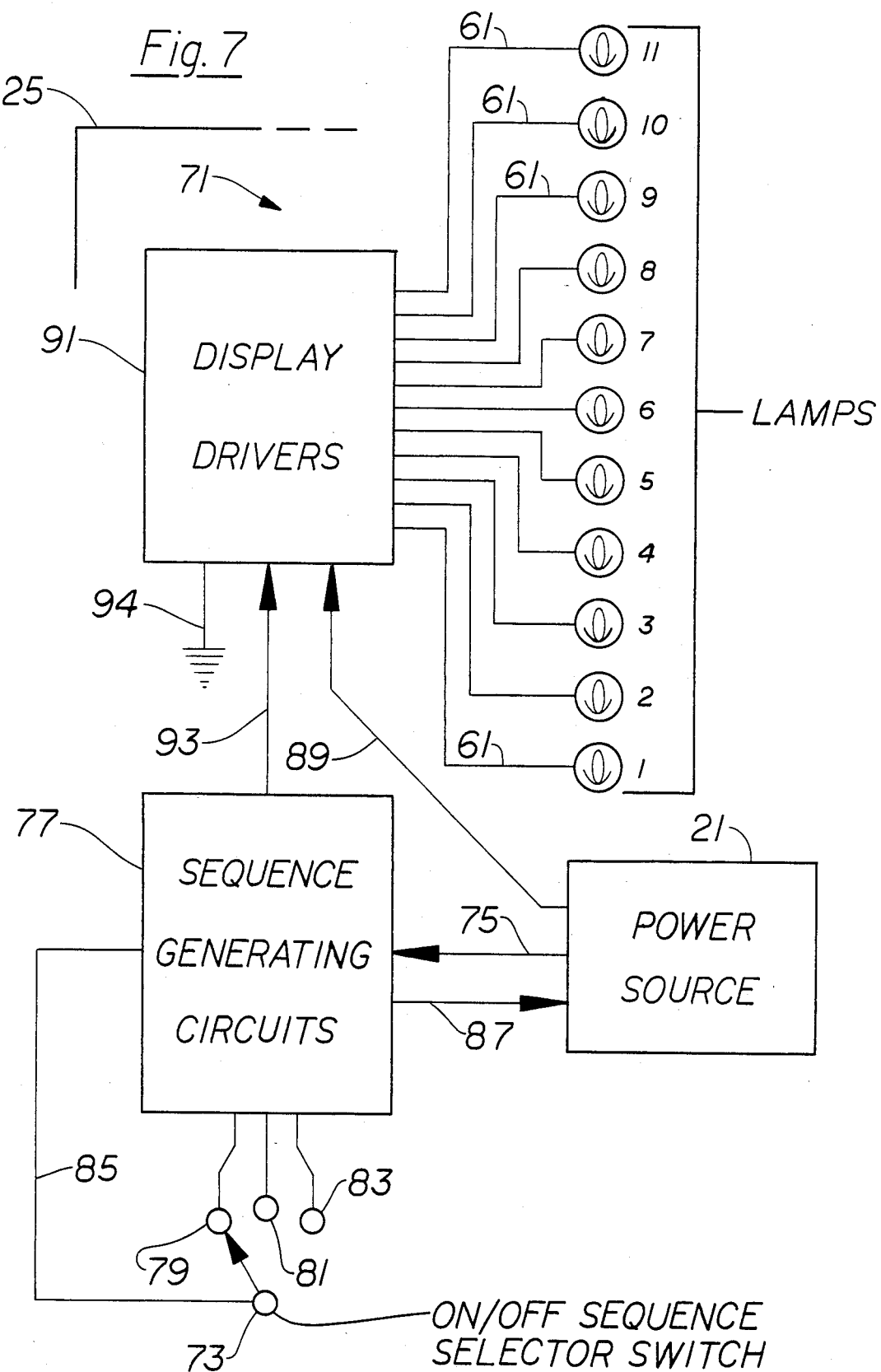

LIGHT WAND ASSEMBLY FOR BICYCLES, MOTORBIKES, ETC.

The present invention relates to a light wand assembly for bicycles or other vehicles including a person which includes a frame support member. An electrical component case has a clamp for securing the case to the frame support member. An electrical power source is nested within the case which includes a socket arm mounting a tubular flagpole at its outer end carrying an elongated transparent light wand. The present improvement includes a circuit board having a solid state printed circuit thereon including a plurality of individually operable sequencer generating circuits together with an on/off sequencer selector switch, with a cable selectively connected to one of the sequencer circuits and including a plurality of lead wires individually connected to a plurality of light bulbs along the length of the wand.

BACKGROUND OF THE INVENTION

Heretofore various types of lighting means have been applied to vehicles including bicycles and the like wherein a light bulb at the top of a light wand is illuminated from a battery power source together with a switch for energizing the light bulb and in one or two cases an off-on flasher has been included in the electrical circuit.

THE PRIOR ART

Such earlier prior art efforts are shown and disclosed in one or more of the following U.S. Patents:

| U.S. PAT. NO. | DATE | NAME |
| --- | --- | --- |
| 3,862,410 | January 21, 1975 | John H. Maxwell |
| 3,890,497 | June 17, 1975 | David H. Rush |
| 4,032,032 | May 10, 1977 | Jack E. Taylor |
| 4,041,452 | August 9, 1977 | Castulo J. Moya |
| 4,099,222 | July 4, 1978 | James R. Cornell |
| 4,157,075 | June 5, 1979 | John Kirvutza |
| 4,274,127 | June 16, 1981 | Blaine E. Beck |
| 4,309,741 | January 5, 1982 | Sidney M. Smith |

SUMMARY OF THE INVENTION

It is an important feature of the present invention to provide a light wand assembly for bicycles or motorbikes or snowmobiles or wheelchairs or carried by a person which includes a frame support member on the vehicle or upon the person to which the complete light wand assembly is connected.

Another feature is to provide an electrical component case which is secured to the frame support member by a suitable clamp, and with an electrical power source stored within the component case, such as by a plurality of dry cell batteries and wherein alternately the electrical power source could be an electrical generator on a part of any vehicle to which the light wand assembly is attached.

A further feature includes a novel component case consisting of a pair of symmetrical halves for enclosing a circuit board having a solid state printed circuit thereon and which is connected to the power source, together with a clamp assembly adapted for securing the case halves together and removably securing the case to the frame support member.

Another feature includes a circuit board having in the circuit a plurality of individually operable sequencer generating circuits together with an on/off sequencer selector control switch on the case adapted for selective connection to any one of the sequencer generating circuits.

A further feature includes a series of longitudinally spaced bulbs mounted and positioned along the length of a transparent tubular light wand together with a plurality of lead wires individually connected to the respective bulbs and selectively to one of the plurality of sequencer generating circuits.

A further feature includes a cable selectively connected to one of the sequencer circuits including a plurality of lead wires individually connected to each of the light bulbs for intermittent illumination thereof and in accordance with one of the sequencer generating circuits for a predetermined sequence of progressive illumination along the length of the wand.

As a further feature there may be a single sequencer circuit included within the circuit board circuit and wherein the lights along the length of the wand for intermittently illuminated in accordance with such sequence generating circuit for a predetermined sequence of progressive illumination of said bulbs substantially along the length of the wand.

A further feature includes in the electrical circuit a display driver power intensity control which is connected to the power source and to the lead wires for directing sufficient power to illuminate the bulbs.

A further feature in conjunction with the solid state printed circuit is the sequencer generating circuits and the display driver in the form of an electronic chips included within the circuit upon the circuit board.

These and other features and objects will be seen from the following specification and claims in conjunction with the appended drawings.

THE DRAWINGS

FIG. 2 is a side elevational view of the light wand shown in FIG. 1, on an increased scale.

FIG. 3 is a partly broken away vertical section of the connection between the tubular flagpole and light wand of FIG. 1, on an increased scale.

FIG. 4 is a plan section of the component case and clamp assembly taken in the direction of arrows 4—4 of FIG. 5.

FIG. 5 is a vertical section taken in the direction of arrows 5—5 of FIG. 4.

FIG. 6 is a partly broken away and sectioned right side elevational view of the component case shown in FIG. 5.

FIG. 7 is a schematic diagram of the circuit board solid state printed circuit thereon and the connections between the power source, the plurality of sequencer generating circuits, the display driver and the plurality of light bulbs for the light wand.

Figure 1:
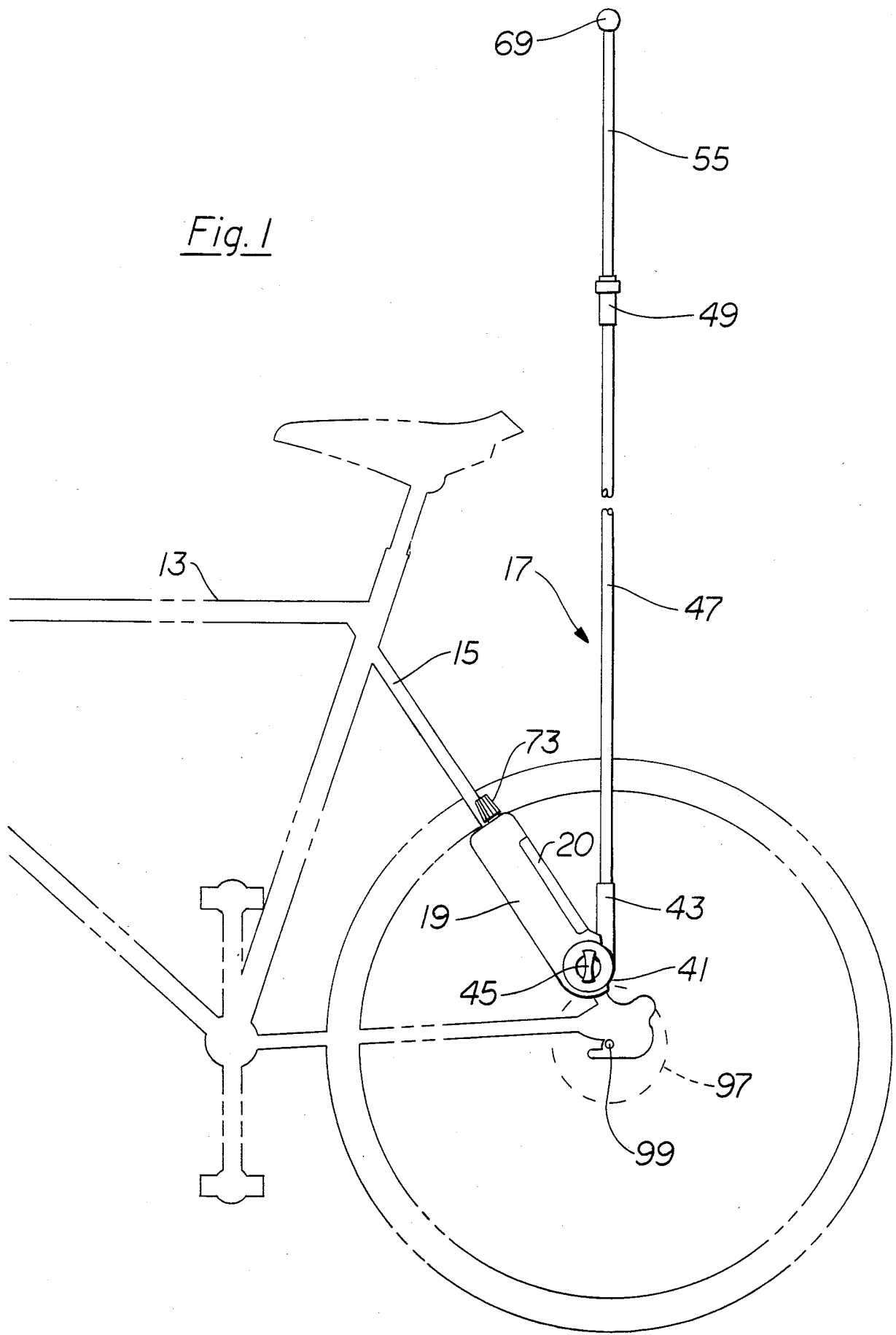
FIG. 1 is a fragmentary side elevational view of a vehicle, such as a bicycle, to which the present light wand assembly is attached.

It will be understood that the above drawings illustrate merely a preferred embodiment of the invention and that other embodiments are contemplated within the scope of the claims hereafter set forth.

DETAILED DESCRIPTION OF AN EMBODIMENT OF THE INVENTION

Referring to the drawing, the plurality of light bulbs and sockets are nested within and along the length of the light wand 55, FIGS. 1 and 2 are designated in the schematic diagram of FIG. 7 by the numbers 1 through 11.

In the illustrative embodiment, a bicycle 13 is fragmentarily shown, including a mounting member 15. It is contemplated as equivalent in the present invention that the light wand assembly could be applied to motorbikes, snowmobiles, ATV's, boats, wheelchairs or to a person wherein there is included thereon a mounting member to which the present electrical component case 19 can be connected as in FIG. 1.

The present safety light assembly 17, FIG. 1, includes a component case 19 having a pair of symmetrical cover members within which is stored power source 21, in the illustrative embodiment 5 C drycell batteries. The case includes a removable battery access lid 20.

While five drycell batteries have been disclosed, any number could be used. Alternatively, the power source could be upon the exterior of the component case and could an electric generator as schematically shown at 97 upon the rear axle 99 of the vehicle or in this case the bicycle 13.

In the illustrative embodiment, FIGS. 4 and 5, the drycell batteries 21 are interposed between the opposed sets of resilient contacts 23 upon the interior of the case. The printed circuit board 25 is positioned within said case and has a solid state printed circuit 71 thereon connected to said power source. The printed circuit 71 includes the circuit board 25 schematically shown in the electrical diagram, FIG. 7.

The longitudinally spaced pairs of opposing V-blocks 27 and 29 are mounted and secured upon one side of case 19, bear against and receive opposite sides of mounting member 15 are secured thereto by a plurality of screw fasteners 31. Said screw fasteners extend through the opposed aligned spacer screw guides 33 forming a part of the respective case halves and provide a means for securing the case halves together and for securing the case to mounting member 15, FIGS. 4, 5 and 6.

Forming a part of the case, as shown in FIG. 6, is a bearing member 35 which receives disc 37 mounted upon pivot pin 39 which extends between the case halves for mounting the pivotal support 41 for socket arm 43, sometimes referred to as a support means. A suitable friction clamp 45, FIG. 1, is adapted for adjustably securing the socket arm 43 in a predetermined angular position with respect to component case 19, as designated by the arrows in FIG. 5.

Tubular flagpole 47, sometimes referred to as an elongated support member or as a support tube, at one end projects down into socket arm 43 and is suitably secured therein as by friction or otherwise. Connector 49, FIG. 3, has a bore 51 into which projects the upper end of flagpole 47 or other support tube, which may be transparent. Said connector includes a counterbore 53 adapted to cooperatively receive the lower end of the transparent tubular light wand 55, preferably constructed of plastic or plexiglass or other clear lensed material, or which could be translucent.

Light wand 55 may be a permanent part of the flagpole 47 and suitably secured thereto. Alternately in the present embodiment, the light wand 55 is removably mounted within connector 49. Anchor channel 65 within and around the interior of connector 49 receives the flexible snap ring 67 or other securing means which extends into an annular recess 68 within fastener sleeve 64 upon the lower end of light wand 55. This provides a means by which the light wand 55 at its lower end is retained within connector 49 at the upper end of the flagpole 47.

A series of longitudinally spaced sockets 57 and corresponding bulbs 59, identified by the numbers 1 through 11 in FIG. 7, are positioned within light wand 55 along its length, and may be anchored therein as at 95, FIG. 2. Separate lead wires 61 at their one ends are connected to the respective bulbs 1 through 11, as shown in the electrical circuit, FIG. 7, and are normally encased within cable 63. Said cable extends from the component case 19 outwardly through socket arm 43 and tubular support 47 through and along the length of light wand 55 connecting the respective bulbs numbered 1 through 11. A neon type of bulb could be used or LEDS.

A protective ball 69 in the form of a shock absorber is mounted upon the upper end of tubular transparent light wand 55 and is constructed of plastic, rubber or plexiglass, for illustration. The ball is also an eye protector.

The present electrical circuit is designated at 71 as a schematic block diagram, FIG. 7, and includes printed circuit board 25, fragmentarily shown, and illustrated further in FIG. 5 as nested and retained within component case 19 by fasteners 31.

SOLID STATE CONTROL FOR MULTIPLE LIGHT PATTERNS

Mounted upon the component case 19 is an on/off sequence selector switch 73, which could be a toggle switch or a slide switch, and through power lead 75 and electrical lead 85 is connected to power source 21.

An integrated circuit chip 77 includes a plurality of sequence generating circuits, such as three sequences in the illustrative embodiment, connected by the respective leads, FIG. 7, to the sequencer contacts 79, 81 and 83 respectively.

The circuit includes a plurality of individually operable sequencer generating circuits 79, 81 and 83 connected to the power source at 75 and further connected to the "on" or "off" sequence selector control switch 73 by lead 85. By this construction the on/off switch may be manually set for any of the three sequence generating circuits 79, 81 or 83 or in an intermediate "off" position.

Ground lead 87 interconnects the power source and chip 77 which includes said plurality of sequence generating circuits.

A further power lead 89 is connected to power source 21 and integrated circuit chip 91, suitably grounded at 94, referred to as a display driver intensity control. Chip 91 through lead 93 is selectively connected to any one of the preselected sequence generating circuits 79, 81 or 83, in the illustrative embodiment. Each of the chips has an insulator cover 92 to separate it from the adjacent battery.

The above cable 63 includes a series of individual lead wires 61 connected at their one ends to the respective light bulbs 1 through 11, FIG. 7. Their other ends are respectively connected through the display driver chip 91 to one of the preselected sequence generating circuits 79, 81 or 83 in chip 77.

The cable 63, FIG. 5, including the respective lead wires 61 through the power intensity control display driver chip 91 are connected by lead 93 to the chip 77 which includes the three sequence generating circuits 79, 81 and 83 of FIG. 7. Depending upon the position of the on/off sequence selector control switch 73 upon case 19, any one of the three sequence generating circuits may be connected to the power source and through the lead 93 and display driver 91 and leads 61 to the respective light bulbs 1 through 11. Switch 73 could be mounted elsewhere than on case 19.

This provides for intermittent illumination of the respective light bulbs 1 through 11 in accordance with one of the sequence generating circuits for a predetermined sequence of progressive illumination of the light bulbs along the length of the wand or a random sequence.

It is contemplated as a part of the present invention that there may be a single sequence generating circuit connected to the on/off sequence control switch 73 and the power source 21, and through lead 93 to the display driver chip 91 to the respective leads 61 to the bulbs 1 through 11.

The generating circuit may provide for a random lighting of the individual bulbs over a period of one-quarter of a second, approximately, in accordance with a random pattern or may be in conjunction with preselective patterns as follows. One pattern, for example, such as for the sequence generating circuit 79 will include initial illumination of bulbs 1 through 5 for a quarter of a second, for illustration, though no limited to that time period, successively the bulb number 1 is turned off and the bulbs 2 through 6 illuminated, and in progression successively the next light bulbs 3 through 7. The bulbs 1 and 2 are off. Then the group of five lights 4 through 8 are illuminated until finally the group of five lights as in the circuit, FIG. 7 has moved from the bottom of the line to the top of the line, during such timed intervals as will provide the intermittent illuminating effect but with such light memory in the human eye that the wand will appear to be illuminated throughout its length in a pulsating pattern moving from the bottom to the top of wand 55.

When the sequence is such that the last four bulbs 8, 9, 10 and 11 have been illuminated, there will also be included the illumination of bulb 1 in the above five group. The sequence repeats from the bottom of the wand to the top with five groups of adjacent bulbs moving the length of the light wand and starting over at the bottom.

As illustrative of another sequence generating circuit such as the sequencer circuit 81, the sequence may be initially bulbs 1, 2 and 3 and bulbs 9, 10 and 11 illumated. The groups of lighted bulbs move inwardly followed by illumination of the group of bulbs 2, 3 and 4 and 10, 9 and 8, with the lighting in groups of three moving towards the center of the wand. When at the center, five lamps for illustration are on, such as bulbs 4, 5, 6, 7 and 8, with the balance of bulbs off momentarily, such as for the quarter of a second interval. Next with three lights at the center, such as bulbs 5, 6 and 7 and the top and bottom bulbs 1 and 11 are illuminated. Thereafter the series repeats itself with the bulbs in groups of three being illuminated in a pulsating manner from the outer ends of the wand inwardly to the center and with the repeat of that sequence.

Any particular sequence for the generating circuit corresponding to circuit 83 of FIG. 7 could be any preselected for a selective pattern of lighting the respective bulbs 1 through 11, for short intervals, so as to provide a pulsating attracting light pattern of illumination along the length of the wand. This is particularly helpful as a safety feature for use at night to give the appearance that the wand, while including pulsating light sources therein, has the effect of full illumination throughout its height.

While there may be one sequence generating circuit, or a random sequence circuit provided in conjunction with the power intensifier display driver chip 91 to the respective bulbs 1 through 11, in the illustrative embodiment there is shown the use of a plurality of sequence generating circuits 79, 81 and 83. This number could be more or less as desired.

While 11 light bulbs are shown for illustration in the diagram FIG. 7, any suitable number of light bulbs may be employed. In accordance with the present invention the light bulbs are arranged along substantially the full length of wand 55. The present solid state control circuit 71, FIG. 7, provides and creates specific light patterns in the present illustrative embodiment up to three different patterns for illustration.

Having described my invention, reference should be had to the following claims.

I claim:

1. A light wand assembly for connection to a vehicle including a mounting member thereon;
   an electrical component case;
   a clamp means on the case removably secured to said mounting member;
   an electrical power source;
   a circuit board having a solid state printed circuit thereon positioned within said case and connected to said power source;
   said circuit including a plurality of individually operable sequencer generating circuits;
   and an on/off sequencer selector control switch adapted for selective connection to any of said sequencer generating circuits;
   a support means upon said case;
   an elongated hollow support member secured upon said support means;
   an elongated transparent hollow light wand at one end secured to said support member;
   a series of longitudinally spaced bulbs nested within said wand along its length;
   and a cable selectively connected to one of said sequencer circuits and including a plurality of lead-wires individually connected to each of said bulbs, for intermittent illumination thereof in accordance with one of said sequence generating circuits for a predetermined sequence of progressive illumination along the length of said wand.

2. In the light wand assembly of claim 1, pivot means interconnecting said support means with said case;
   and including friction means for adjustably securing said support means at a angle relative to said case.

3. In the light wand assembly of claim 1, said component case including a pair of symmetrical opposed halves;
   said clamp means including a pair of longitudinally spaced opposing V-blocks mounted upon said case and operatively engaging said mounting member;
   and fasteners extending through said case and into said V-blocks for securing said case halves together and for securing the case to said mounting member.

4. In the light wand assembly of claim 1, a protective resilient transparent ball mounted upon the outer end of said light wand.

5. In the light wand assembly of claim 1, a hollow connector mounted upon the other end of said hollow support member projecting therefrom;
   said light wand projecting into said connector;

and a locking means in said connector retainingly engaging said light wand.

6. In the light wand assembly of claim 1, one of said sequencer generating circuits providing a random lighting cycle.

7. In the light wand assembly of claim 1, said circuit further including a display driver power intensity control connected to said power source and to said lead wires.

8. In the light wand assembly of claim 7, said sequencer generating circuits and said display driver being in the form of electronic integrated circuit chips upon said circuit board.

9. In a light wand assembly for connection to a vehicle including a mounting member thereon, an electrical component case, a clamp means on the case removably secured to said mounting member, an electrical power source, a support means upon said case, an elongated hollow support member secured upon said support means;

the improvement comprising a circuit board having a solid state printed circuit thereon positioned within said case and connected to said power source;

said circuit including a plurality of individually operable sequencer generating circuits;

and an on/off sequencer selector control switch on said case adapted for selective connection to any of said sequencer generating circuits;

an elongated transparent hollow light wand at one end secured to said support member;

a series of longitudinally spaced bulbs nested within said wand along its length;

and a cable selectively connected to one of said sequencer circuits and including a plurality of leadwires individually connected to each of said bulbs, for intermittent illumination thereof in accordance with one of said sequence generating circuits for a predetermined sequence of progressive illumination along the length of said wand.

10. In the light wand assembly of claim 9, said circuit further including a display driver power intensity control connected to said power source and to said lead wires.

11. In the light wand assembly of claim 9, said sequencer generating circuit and said display driver being in the form of electronic integrated circuit chips upon said circuit board.

12. In the light wand assembly of claim 9, pivot means interconnecting said support means with said case and including friction means for adjustably securing said support means at a predetermined angle relative to said case.

13. In the light wand assembly of claim 9, said component case including a pair of symmetrical opposed halves;

said clamp means including a pair of longitudinally spaced opposing V-blocks mounted upon said case and operatively engaging said mounting member;

and fasteners extending through said case halves and into said V-blocks for securing the case halves together and for securing the case to said mounting member.

14. In the light wand assembly of claim 9, a hollow connector mounted upon the other end of said hollow support member projecting therefrom;

said light wand projecting into said connector;

and a snap ring in said connector retainingly engaging said light wand.

15. A light wand assembly for connection to a vehicle including a mounting member thereon;

an electrical component case;

a clamp means on the case removably secured to said mounting member;

an electrical power source;

an electrical circuit within said case and connected to said power source;

said circuit including a sequencer generating circuit;

and an on/off control switch on said case connected to said sequencer generating circuit;

a socket arm upon said case;

an elongated hollow support member secured to said socket arm;

an elongated transparent hollow light wand at one end secured to said support member;

a series of longitudinally spaced bulbs nested within said wand along its length;

and a cable connected to said sequencer circuit and including a plurality of leadwires individually connected to each of said bulbs, for intermittent illumination thereof in accordance with said sequence generating circuit for a predetermined sequence of progressive illumination along the length of said wand.

16. In the light wand assembly of claim 15, said circuit including an additional sequencer circuit;

said control switch including a sequencer selector connected to said sequencer generating circuits, said cable lead wires being connected to both of said sequencer circuits.

* * * * *